United States Patent
Bruijns et al.

(10) Patent No.: US 8,781,257 B2
(45) Date of Patent: Jul. 15, 2014

(54) SYNCHRONIZATION OF TWO IMAGE SEQUENCES OF A PERIODICALLY MOVING OBJECT

(75) Inventors: Antonius Johannes Cornelius Bruijns, Best (NL); Johannes Albert Luijendijk, Oostelbeers (NL)

(73) Assignee: Koninklijke Philips N.V., Eindhoven (NL)

( * ) Notice: Subject to any disclaimer, the term of this patent is extended or adjusted under 35 U.S.C. 154(b) by 235 days.

(21) Appl. No.: 13/260,396

(22) PCT Filed: Mar. 22, 2010

(86) PCT No.: PCT/IB2010/051233
§ 371 (c)(1),
(2), (4) Date: Sep. 26, 2011

(87) PCT Pub. No.: WO2010/109402
PCT Pub. Date: Sep. 30, 2010

(65) Prior Publication Data
US 2012/0027259 A1 Feb. 2, 2012

(30) Foreign Application Priority Data
Mar. 27, 2009 (EP) .................... 09156431

(51) Int. Cl.
*G06K 9/32* (2006.01)
*G06K 9/00* (2006.01)
*G06T 7/00* (2006.01)

(52) U.S. Cl.
CPC ..... *G06T 7/0024* (2013.01); *G06T 2207/10016* (2013.01); *G06T 2207/30048* (2013.01)
USPC ........................... 382/294; 382/103

(58) Field of Classification Search
USPC .......... 382/294, 278, 276, 100, 103, 128, 130
See application file for complete search history.

(56) References Cited

U.S. PATENT DOCUMENTS

| | | | |
|---|---|---|---|
| 5,526,813 A | 6/1996 | Yoshida | |
| 6,447,450 B1 | 9/2002 | Olstad | |
| 6,558,325 B1 | 5/2003 | Pang et al. | |
| 7,146,049 B2 | 12/2006 | Flotats et al. | |
| 7,372,984 B2 * | 5/2008 | Dickinson et al. | 382/131 |
| 7,986,822 B2 * | 7/2011 | Hall et al. | 382/128 |
| 2003/0185450 A1 * | 10/2003 | Garakani et al. | 382/232 |
| 2008/0240536 A1 | 10/2008 | Soubelet et al. | |
| 2008/0249402 A1 | 10/2008 | Szucs et al. | |

FOREIGN PATENT DOCUMENTS

| WO | 9937088 A1 | 7/1999 |
|---|---|---|
| WO | 2008075259 A2 | 6/2008 |

\* cited by examiner

*Primary Examiner* — Yon Couso

(57) ABSTRACT

A method and an apparatus for correlating two image sequences of a periodically moving object with respect to the periodicity is described. A first frame sequence of the object moving with the first periodicity is acquired. Therein the first frame sequence comprises at least one cycle of motion. A second frame sequence of the object moving with the second periodicity is acquired. Therein the second frame sequence comprises at least one cycle of motion. The first and the second frame sequences are synchronized with respect to the respective periodicity such that same phases of motion of the periodically moving object are correlated to be presented simultaneously. The present invention allows to compare sequences representing a periodical motion with a different number of frames in each of the sequences for the same cycle of motion. Thereby, e.g. image sequences of a beating heart acquired before and after a therapy may be presented in a synchronized way and therefore may be easily compared.

18 Claims, 4 Drawing Sheets

SYNCHRONIZATION OF TWO IMAGE SEQUENCES OF A PERIODICALLY MOVING OBJECT

FIELD OF THE INVENTION

The present invention relates to the field of correlating two image sequences of a periodically moving object with respect to the periodicity. Particularly, the present invention relates to a method and an apparatus for correlating to image sequences of a periodically moving object. Furthermore, the present invention also relates to a computer program element adapted for controlling such method when executed on a computer and to a computer-readable medium on which such computer program element is stored.

BACKGROUND OF THE INVENTION

In many areas of science it may be important to supply image sequences of an object of interest to a viewer. In the case that the object of interest is moving periodically it may be interesting to compare image sequences acquired at different points in time. Particularly in some areas of medicine it may be important to compare the behaviour of a moving organ as for example the heart or the lungs before and after a certain event.

For example, in interventional cardiology which deals with catheter-based diagnosis and treatment of heart diseases stents may be placed in coronary arteries to improve the oxygen rich blood delivery to the micro-vasculature of the heart muscle. After an intervention outcome validation is needed to estimate the effect and success of the treatment and to determine follow-up medication and/or the use of other therapies. A check if there is an increase of the arterial blood flow and an increase of myocardium perfusion after placing the stent is not easy because the heart beating rate is often different from before the treatment.

A known method for comparison between the arterial blood flow and perfusion before and after stenting is Thrombolysis In Myocardial Infraction (TIMI) Frame Count. The comparison is achieved by counting the frames from the moment a contrast agent (CA) is entering the vessel under investigation until the full filling of the vessel or until the contrast agent starts entering the muscle tissue like for example the myocardium.

The comparison which may be achieved by counting frames is not as accurate as may be desired. Furthermore, the comparison result achieved in this way is indirect and only provides an approximate quantitative number. For example, a possible result of TIMI Frame Count is increased blood flow after stenting. However, when the heart rate is different compared to pre-stenting, a mis-interpretation of the clinical outcome can easily occur.

There may be a need for a method or apparatus for correlating two frame sequences of a periodically moving object with respect to the periodicity which correlation allows for an improved direct comparison of the frame sequences.

SUMMARY OF THE INVENTION

These needs may be met by the subject-matter according to the independent claims. Advantageous embodiments of the present invention are described in the dependent claims.

According to a first aspect of the present invention a method for correlating two image sequences of a periodically moving object with respect to the periodicity is provided. The method comprising acquiring a first frame sequence of the object moving with a first periodicity; therein the first frame sequence comprises at least one cycle of motion; acquiring a second frame sequence of the object moving with a second periodicity; therein the second frame sequence comprises at least one cycle of motion; synchronizing the first and the second frame sequences with respect to the respective periodicity such that same phases of motion of the periodically moving object are correlated.

In other words, the first aspect of the present invention may be seen as based on the idea to set two image sequences in relation to each other with respect to the same phase of motion, such that both frame sequences may be compared directly for example by displaying both frame sequences simultaneously.

For example, a first frame sequence is acquired during a cyclic motion of an object of interest such as the heart. Therein, the cyclic motion has a certain first periodicity. In the example of the heart as the moving object of interest the periodicity may depend on the heart rate. Later on for example after an intervention procedure a second frame sequence is acquired. During this acquisition the object may move with the second periodicity which may differ from the first periodicity. Therein, both sequences are preferably acquired with the same frame rate which results in a different number of frames for one cycle of motion within the first and the second frame sequences.

In the example of the heart as the moving object the heart might have a higher heart rate during the acquisition of the first frame sequence and a lower heart rate during the acquisition of the second frame sequence. The first and the second sequences comprise at least one cycle of the motion which means that for example one heartbeat is included in each of the sequences.

A correlation of the frame sequences is established by synchronizing the first and the second sequences such that a frame of the first frame sequence with a certain phase of motion of the moving object is correlated to a frame with the same phase of motion in the second frame sequence. E.g. a frame of the first frame sequence with the heart in a diastole state is correlated with the frame of the second frame sequence in the same state. The frames are correlated in such a way that they can be presented simultaneously and be compared by a user as for example a physician.

Correlating of the two frame sequences may denote that the frames are set in relation. A matching relation between a frame in the first frame sequence and a frame in the second frame sequence is created for example by assigning certain labels to the frames. For example, frames which comprise the moving object in the same phase of motion may be assigned a same label. Due to this mutual association of the frames of different frame sequences the same phase of motion of the periodically moving object may be displayed and viewed at the same time.

An image sequence is for example a set or a series of images which follow each other in time. A set of images may for example be acquired with an X-ray apparatus and may be viewed by a viewer as a movie.

The periodically moving object may be an object of interest as for example an organ of a human body like a heart, a lung or an artery. The motion of the object is periodical which means that for example certain changes in shape or changes in location of the object are happening or occurring in regular intervals of time. The motion has repeated cycles. In the case of a heart a cycle of motion may include the states of atrial systole, ventricular systole and a cardiac diastole, i.e. one heartbeat.

The acquisition of the first and the second frame sequences may denote retrieving from a database or a memory or an obtaining of images by a certain technique as for example computer tomography (CT), single-photon emission computed tomography (SPECT), positron emission tomography (PET), magnetic resonance (MR), rotational X-ray and ultrasound imaging. In the case of X-ray imaging a sequence of images may be obtained after the injection of a contrast agent (CA).

For example, a first frame sequence may be obtained with the help of an imaging apparatus such as a computer tomograph (CT) and stored in a memory for later use. After an intervention the first frame sequence may be retrieved from the memory and a second frame sequence may be obtained with the help of an imaging apparatus. The first frame sequence and the second frame sequence may be acquired sequentially or alternatively both frame sequences may be retrieved from a database or a memory before the synchronization. Therein, the first frame sequence and the second frame sequence preferably do not coincide in time.

A frame may comprise a data set acquired at a certain rate representing image information. This data may be presented as an image and viewed by users. A sequence or series of frames may be viewed as a movie.

The first and the second frame sequences are synchronized with respect to the respective periodicity. The synchronizing may denote an adjustment that causes the frames of the first frame sequence and the second frame sequence to occur or to reoccur in unity. This may relate to an adjustment in time or an adjustment in space. Preferably, by synchronizing the two frame sequences they are adjusted to occur in unity in time and space. The adjustment is done in such a way that the two frame sequences may be presented and viewed simultaneously which may allow for a direct comparison of the two frame sequences. For example, when a heart is the periodically moving object the frame sequences may be synchronized with respect to the heart rate.

The first and the second frame sequences are synchronized such that the same phases of motion of the periodically moving object are correlated. Therein a phase of motion may denote a distinct time period in a sequence of events. Thus, a phase of motion represents a particular point in time in a cycle of motion. In the example of the heart as the moving object the phases of motion may denote for example an atrial systole, a ventricular systole and a cardiac diastole. For example, all the frames of both sequences which represent the motion phase of the diastole where a part of the heart muscle is relaxed may be respectively correlated.

By synchronizing two different frame sequences which were acquired at different points in time and showing the same object moving with different periodicities it is possible to compare these sequences for example by visualizing the first and the second frame sequences simultaneously. In the medical area of the interventional cardiology a direct check of myocardium perfusion after stenting is possible. According to the method described above it is possible to compare a blood flow and perfusion quality before and after stenting accurately and directly for example by visualizing heart rate synchronized frame sequences acquired before and after stenting. For a comparison and evaluation of the result of the intervention a synchronization of the pre- and post-stenting images may be very advantageous because the heart rate of the patient after stenting may significantly differ from the heart rate before stenting.

According to an embodiment of the invention the synchronizing is based on a difference between a first number of frames in a cycle of motion of the first frame sequence and a second number of frames in a cycle of motion of the second frame sequence.

In other words, the first frame sequence and the second frame sequence may be acquired with the same rate, e.g. 15 frames per second. While the acquisition rate may be the same in the first and second sequences the motion of the object may take place with different periodicity during both acquisitions. E.g. a heart beats with a certain rate during the acquisition of the first frame sequence and with a different rate, for example faster, during the acquisition of the second frame sequence. Thus one cycle of motion may be represented with a different quantity of frames in the first and in the second sequences. For example, in the first sequence 15 frames may correspond to one cycle of motion e.g. one heartbeat and in the second frame sequence 18 frames may correspond to one cycle of motion.

The first number of frames may represent a number of frames between two frames which correspond to the same phase of motion in the first frame sequence. The second number of frames accordingly may correspond to the number of frames between two frames which correspond to the same phase of motion in the second frame sequence. The number of frames relates to a quantity or amount of frames.

A difference in the number (i.e. quantity) of frames in one cycle of motion between the first frame sequence and the second frame sequence is determined. The difference between the first number of frames and the second number of frames may be determined for example by subtracting the first number of the second number. Based on this difference the frame sequences may be synchronized by adjusting the parts of the frame sequences corresponding to one cycle of motion to comprise the same number of frames. This may for example be achieved by skipping some frames in the longer sequence. In this way the first and the second frame sequences may be represented simultaneously and viewed and compared directly.

According to a further embodiment the method further comprises selecting at least two respectively matching frames with respect to a same phase of motion from the first frame sequence and from the second frame sequence; determining a first number of frames between two matching frames in the first frame sequence; determining a second number of frames between two matching frames in the second frame sequence; comparing the first number of frames and the second number of frames; wherein the synchronizing is based on the comparing result.

The selecting of at least two respectively matching frames from the first frame sequence is done with respect to a same phase of motion. The same phase of motion may for example be a certain stage of the heart cycle as for example the diastole. The two selected respectively matching frames may for example be a frame representing the diastole and a frame representing a diastole after one heart beat. After the selection a first number of frames corresponding to the number of frames between the two matching frames is determined.

Simultaneously or alternatively sequentially at least two matching frames are selected from the second frame sequence which again correspond to the same phase of motion. The same phase of motion denotes the same phase in relation to the first sequence wherein also both selected frames from the second sequence are in the same phase of motion as the frames selected from the first frame sequence, e.g. again representing the diastole state. Then, a second number of frames is determined which corresponds to the number of frames between the two selected matching frames in the second frame sequence.

It is also possible to select for example four frames from the first frame sequence and four frames from the second frame sequence. This may for example respectively correspond to three heartbeats.

After the determination of the first number of frames and the second number of frames these numbers are compared. Comparing may denote establishing the bigger of the two numbers for example by subtracting the first from the second frame number. The comparing result indicates for example which of the first and the second number of frames is bigger for example by labelling the bigger number. The synchronizing is based on the comparing result, for example by making the sequence with the bigger number of frames shorter or by making the frame sequence with the smaller number of frames longer.

According to a further embodiment the synchronizing is realized by adding a third number of frames to the frame sequence with the smaller number of frames between two matching frames or by skipping a third number of frames of the frame sequence with the higher number of frames between two matching frames; therein, the third number of frames corresponds to the difference between the first number of frames and the second number of frames.

Adding a third number of frames to a frame sequence with the smaller number of frames may for example be realized by creating duplicate frames within this frame sequence. Alternatively, the additional frames may be created by interpolating the motion of the moving object at certain points. The third number of frames may be different for different cycles of motion.

The adding or skipping of frames may be spaced equally in time. I.e. the frames are added or skipped within one cycle of motion after an equal number of frames. For example, when two frames have to be added to a cycle of motion (i.e. the third number of frames is two) comprising nine frames, then one frame may be added after the third frame of the sequence and one frame may be added after the sixth frame.

By adding a third number of frames to the sequence with the smaller number of frames or by skipping a third number of frames in the frame sequence with the higher number of frames, the first frame sequence and the second frame sequence are made equally long, i.e. they comprise the same number of frames. This makes a comparison and presentation of both sequences easier.

Alternatively, a comparison may be made possible by adding some frames to the frame sequence with the smaller number of frames and by simultaneously skipping some frames in the frame sequence with the higher number of frames between two matching frames. Particularly, a part of the third number of frames for example the half may be added to the frame sequence with the smaller number of frames and the remaining part of the third number of frames may be skipped in the other frame sequence, thereby making the first frame sequence and the second frame sequence equally long.

According to a further embodiment the steps of the method are executed automatically.

Automatically may denote without the necessity of a user interaction. I.e. no control or input of a user as for example a physician is needed for the correlation of the two image sequences.

By executing the steps of the method for correlating the two image sequences automatically the accuracy and reliability of the method may be greatly enhanced. Furthermore, the method may be executed faster.

According to a further embodiment the method further comprises subtracting a first frame of one of the first and the second frame sequences from all frames of both the first and the second frame sequence.

The first frame may for example either be a frame of the first frame sequence or a frame of the second frame sequence. Alternatively, the first frame may be different for the first frame sequence and for the second frame sequence. Particularly, a first frame may be selected from the first frame sequence and may be subtracted from all frames of the first frame sequence. Furthermore, a first frame may be selected from the second frame sequence and may be subtracted from all frames of the second frame sequence. The first frame may be selected by a user or selected automatically for example as a frame at the beginning of a frame sequence having the best contrast or other characteristic qualities.

The selected first frame is subtracted from the first frame sequence and subtracted from the second frame sequence. The purpose of subtracting the first frame from both sequences may be to determine frames corresponding to the same phase of motion, namely the same phase of motion as the first frame. In this way for example a heart rate may be extracted from the acquired images without the need of additional information. In the case that a spatial correspondence of the first frame sequence and the second frame sequence is determined before the subtraction of the first frame, the same first frame may be subtracted from both frame sequences. In the case that no spatial correspondence is determined before subtraction of the first frame, the first frame subtracted from the first frame sequence may differ from the first frame subtracted from the second frame sequence.

The determination of frames with the same phase of motion by subtracting a first frame from each frame of the frame sequences may function as follows: By subtracting a frame from another frame only the differences between the frames remain in the resulting frame. Thus, when two frames which are identical or nearly identical are subtracted from each other the result is a "black" or almost "black" frame, i.e. a frame containing no or almost no information. For example, when two perfectly matching i.e. identical images are subtracted the result may be an image with all pixel values at level zero, which may be represented as black or in a negative representation as white. In this way after subtracting a certain frame from all the other frames the resulting white frames may be identified as frames of the same motion phase as the first frame which was subtracted from the two sequences.

The subtraction may be a log-subtraction. By first making the logarithm and then subtracting a first frame from the frame sequences also small differences in the frames may be considered. The log-subtraction of the first frame from another frame may correspond to dividing pixel values of both frames.

Determining the same phase of motion in the first and second frame sequences by subtracting a first frame allows for a very exact determination of frames with the same phase of motion.

According to a further embodiment the method further comprises determining a spatial correspondence between the first and the second frame sequence.

The spatial correspondence may for example be determined by selecting corresponding image coordinates of a proper window in both frame sequences to have comparable views of the moving object. Therein both windows have an identical size.

A spatial correspondence for example in the presentation of the first and the second frame sequences results in a better comparability of both sequences.

According to a further embodiment the method further comprises displaying the first and the second frame sequences after synchronization in a spatially and temporarily corresponding view.

Both sequences may be presented in the same presentation as for example on a screen or alternatively on several different screens. The displaying may be done in a side by side fashion where the first frame sequence is displayed beside, above or below the second frame sequence. Alternatively both frame sequences may be presented as an overlay with different colours. Therein, for example the first sequence may be presented in a certain colouring and a second sequence may be presented with another colouring or different shadings.

The first and the second frame sequences may be presented after synchronization such that they may be compared. They may correspond spatially, i.e. the perspective on the moving object and the size of the moving object are the same in both sequences. Furthermore, the sequences may be displayed in temporal correspondence which means that same phases of motion are presented at the same time in both sequences.

The synchronized presentation of both frame sequences provides the possibility of an improved accuracy when assessing or measuring for example a post-treatment increase of an arterial blood flow and myocardial perfusion. Furthermore, in the example of a heart rate synchronized viewing of the frame sequences a side by side view of both sequences may provide the possibility of a more accurate rating of the improvement of arterial and myocardial blood flow.

According to a further embodiment the periodically moving object is a heart and the respectively matching frames correspond to the same phase of a heart cycle.

According to another aspect of the invention an apparatus for correlating two image sequences of a periodically moving object with respect to the periodicity is provided. The apparatus comprises acquisition means for acquiring a first frame sequence of the object moving with a first periodicity and for acquiring a second frame sequence of the object moving with a second periodicity. Therein, the first frame sequence comprises at least one cycle of motion; therein, the second frame sequence comprises at least one cycle of motion; the apparatus further comprises computing means for synchronizing the first and the second frame sequences with respect to the respective periodicity such that the same phases of motion of the periodically moving object are correlated.

According to a further embodiment the apparatus further comprises displaying means for displaying the first and the second frame sequence after synchronization in a spatially and temporarily correlated presentation.

According to another aspect of the invention a computer program element is presented, which computer program element is adapted to control the method described above when executed on a computer.

According to a further embodiment the first frame sequence and the second frame sequence are input into the computer program element and a position number of the respectively matching frames of the first frame sequence and the second frame sequence is input into the computer program element.

A position number may correspond to a label attributed to a frame like for example a name. A frame may for example have a position number five, which may indicate that this frame is the fifth frame of a sequence. The position number is not necessarily related to the data comprised in the frame.

According to another aspect of the invention a computer-readable medium with a computer program element described above is presented.

It has to be noted that embodiments of the invention are described with reference to different subject-matters. In particular, some embodiments are described with reference to method type claims whereas other embodiments are described with reference to apparatus type claims. However, a person skilled in the art will gather from the above and the following description that, unless other notified, in addition to any combination of features belonging to one type of subject-matter also any combination between features relating to the different subject-matters, in particular between features of the apparatus type claims and features of the method type claims, is considered to be disclosed with this application.

The aspects defined above and further aspects, features and advantages of the present invention can be derived from the examples of embodiments described hereinafter. The invention will be described in more detail hereinafter with reference to examples of embodiments but to which the invention is not limited.

DETAILED DESCRIPTION OF EMBODIMENTS

Figure 1:
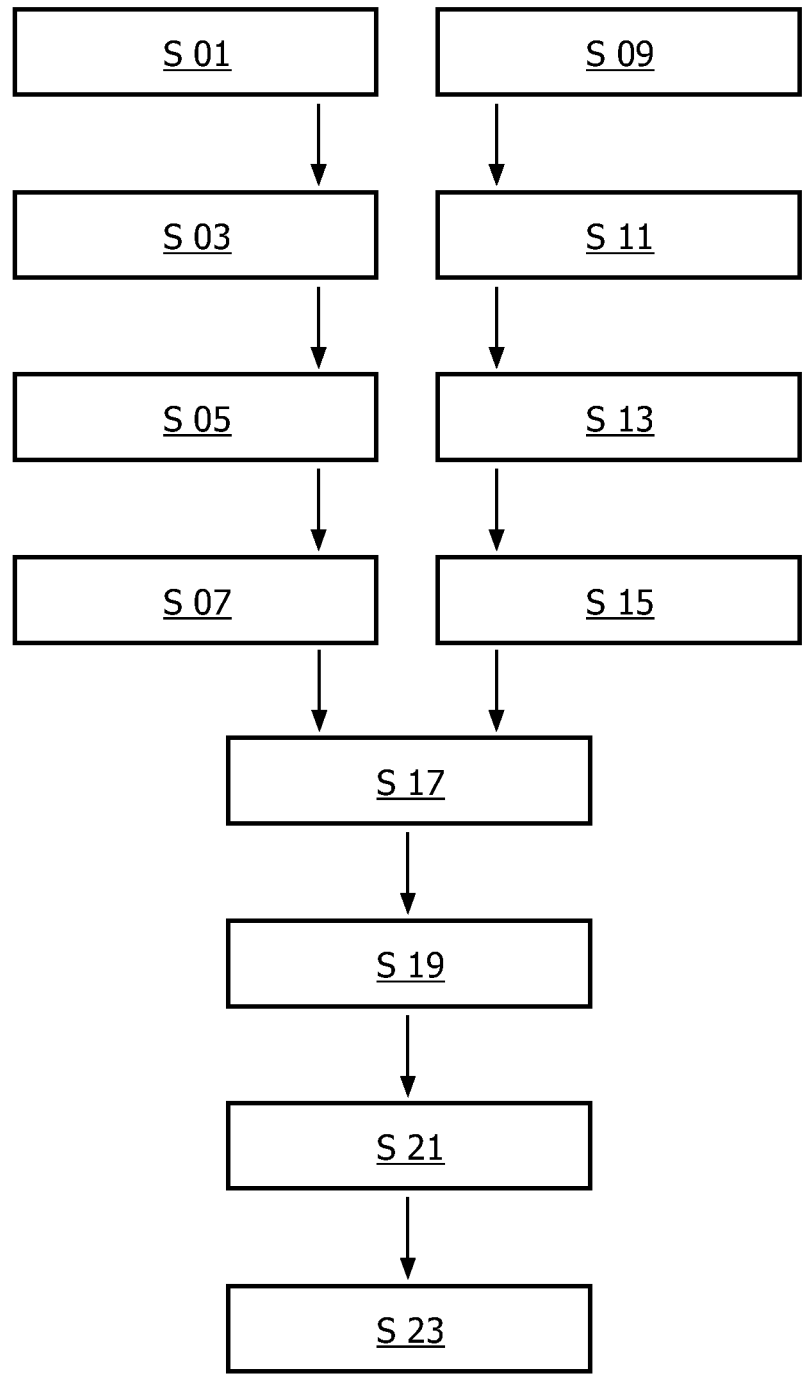
FIG. 1 shows a flow diagram schematically representing a method for correlating two image sequences of a periodically moving object according to one embodiment of the present invention

In FIG. 1 a flow diagram schematically representing a method for correlating two image sequences of a periodically moving object according to one embodiment of the present invention is presented.

In this embodiment a simple implementation of the method helps with the process of concatenating two image sequences into a single synchronized side by side view. In a first step S 01 a first frame sequence (also called a pre-stenting image sequence)

is acquired. This is done for example in connection with interventional cardiology specifically in connection with catheter-based treatment of heart diseases. For example, the first frame sequence is acquired before a therapy as for example a Percutaneous Transluminal Coronary Angioplasty (PTCA) is conducted. E.g. the first frame sequence is acquired before a device such as a stent is placed in a coronary artery to improve the flow of blood in the vessels and to improve the delivery of oxygen rich blood to the microvasculature of the heart muscle. This sequence may be stored in a memory or may be processed immediately.

A second frame sequence (also called post-stenting image sequence) is acquired in step S 09. This second sequence may be used for outcome validation after an interventional treatment for example to estimate the effect and success of the treatment and to determine follow-up medication and/or the use of other therapies.

As an example the first frame sequence and the second frame sequence may comprise frame sequences representing approximately three heartbeats in the example of the heart as the moving object. This is due to the fact that after a contrast agent injection the contrast agent stays for about three heartbeats within the heart or the heart muscle.

After the acquisition of the first frame sequence a starting frame within the first frame sequence is determined (step S 03). The determination of a starting frame may be done by a user or preferably automatically. This step (step S 03) may be used to eliminate unexposed frames at the start of the first frame sequence. For example frames acquired during a time where no contrast agent is present in the vessels or the heart may be skipped. Accordingly in step S 11 a similar starting frame is selected in the second frame sequence. The starting frame of the second frame sequence preferably corresponds to the starting frame of the first frame sequence for example with respect to the phase of motion. This step (step S 11) also may serve to eliminate unexposed images.

In steps S 05 and S 13 appropriate image coordinates in both frame sequences are selected. In step S 05 image coordinates showing a region of interest of the moving object as for example a part of the heart are selected from the first frame sequence. In step S 13 a comparable view of the same part of the moving object is selected. Both image presentations have an identical size for example a window size.

For example, after the selection of appropriate coordinates (steps S 05 and S 13) a first frame is selected from one of the frame sequences. In steps S 07 and S 15 two new image sequences are calculated in which the first image is log-subtracted from both frame sequences. The log-subtracting of the first image may be compared to dividing pixel values of both images. In step S 07 a first frame is subtracted from all frames of the first frame sequence. In step S 15 the same first frame is subtracted from all frames of the second frame sequence.

The steps S 01, S 03, S 05 and S 07 relating to the first frame sequence may be executed simultaneously, i.e. in parallel with the steps S 09, S 11, S 13 and S 15 relating to the second frame sequence. Alternatively the steps relating to the second frame sequence may be executed after the steps relating to the first frame sequence.

After the subtracting step (steps S 07 and S 15) both frame sequences are scanned for frames with a corresponding phase of motion of the periodically moving object. The frames which correspond to the same phase of motion as the first frame are determined based on the subtraction results. The heart cycle matches best with the heart phase of the image that has been subtracted in the images which are "black". A list representing the frame position numbers with matching phases of motion is created (step S 17).

In step S 19 the same number of heartbeats is selected. This is done for example by selecting the same number of frames with the same phase of motion from the first frame sequence and from the second frame sequence.

In step S 21 the first frame sequence and the second frame sequence are synchronized. The synchronization is realized by either adding the appropriate number of duplicate images to the shortest cycle of images or by skipping the appropriate number of images from the longest cycle of images. After that the matching pairs of images are concatenated in horizontal direction to produce for example a side by side view.

In the following an example of frame position numbers of frame sequences of a beating heart is presented to explain the procedure of synchronization. For example, about 60 frames are acquired during about three heartbeats. In the first sequence the following frame position numbers are determined for frames in the same phase of motion: 10, 25, 41, 55. For the second sequence the following frame position numbers are determined: 5, 22, 39, 56. For the first heartbeat in the first sequence 15 frames were acquired (25 minus 10). For the first heartbeat in the second sequence 17 frames were acquired (22 minus 5). Thus the heart beats slower during the acquisition of the second frame sequence. To synchronize the first heartbeat in the first frame sequence and the second frame sequence either two frames have to be added to the first frame sequence or two frames have to be skipped in the second frame sequence. For example, the frame with the position number 10 and the frame with the position number 16 may be skipped in the second frame sequence to synchronize both sequences. The frame position numbers of the frames which are skipped or added are spaced symmetrically i.e. equally in time within the sequence.

The above example shows that it is possible that within one sequence for example within the first sequence a different numbers of frames is acquired between frames with the same phase of motion. This may be due to an irregular heartbeat.

Figure 3:
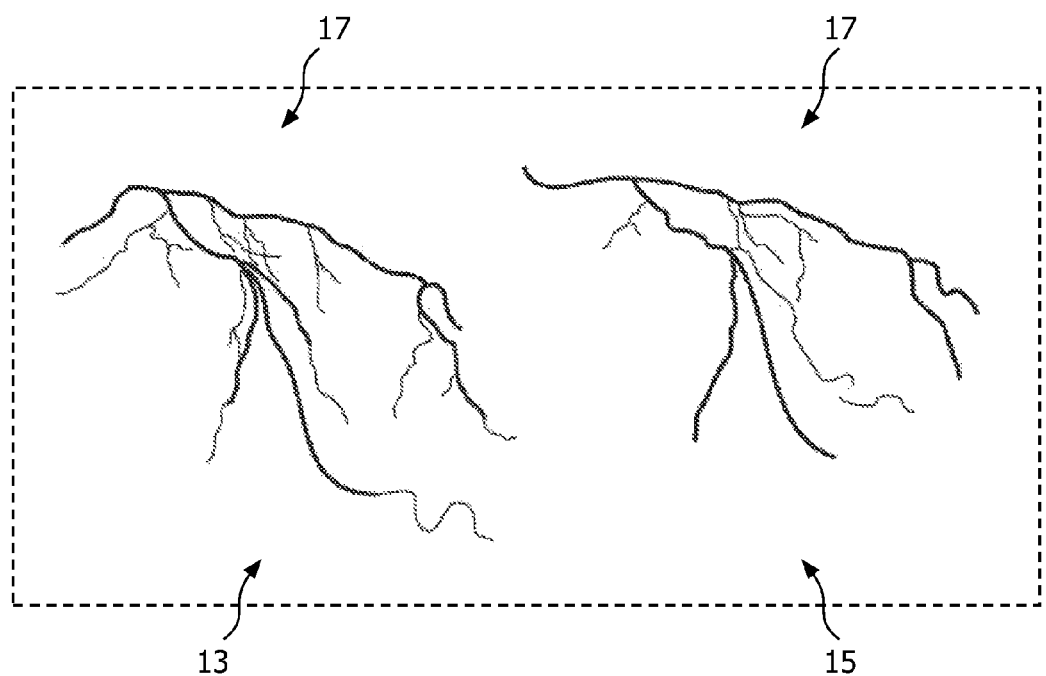
Figure 4:
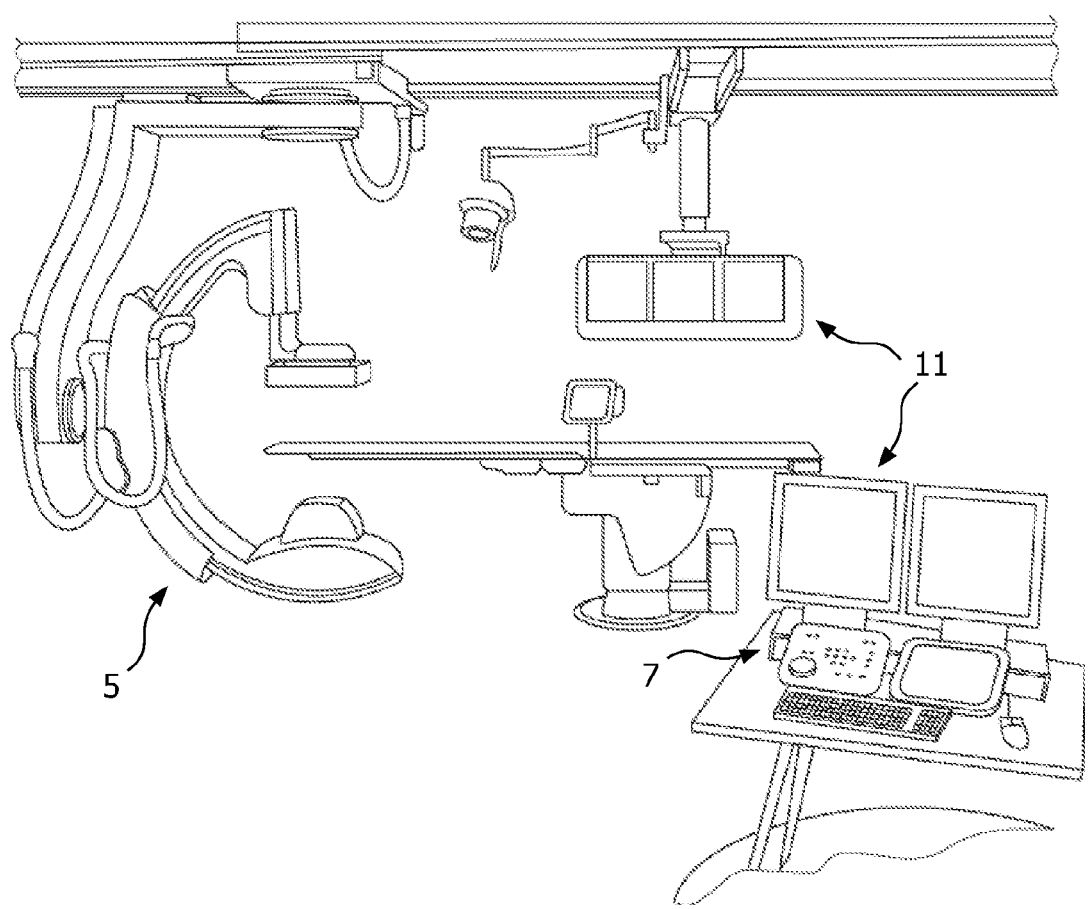

In step S 23 the synchronized image sequences are displayed for example on a screen as shown in FIG. 3 in a side by side view. The frame sequences may also be displayed in separate displays as indicated in FIG. 4.

Figure 2:
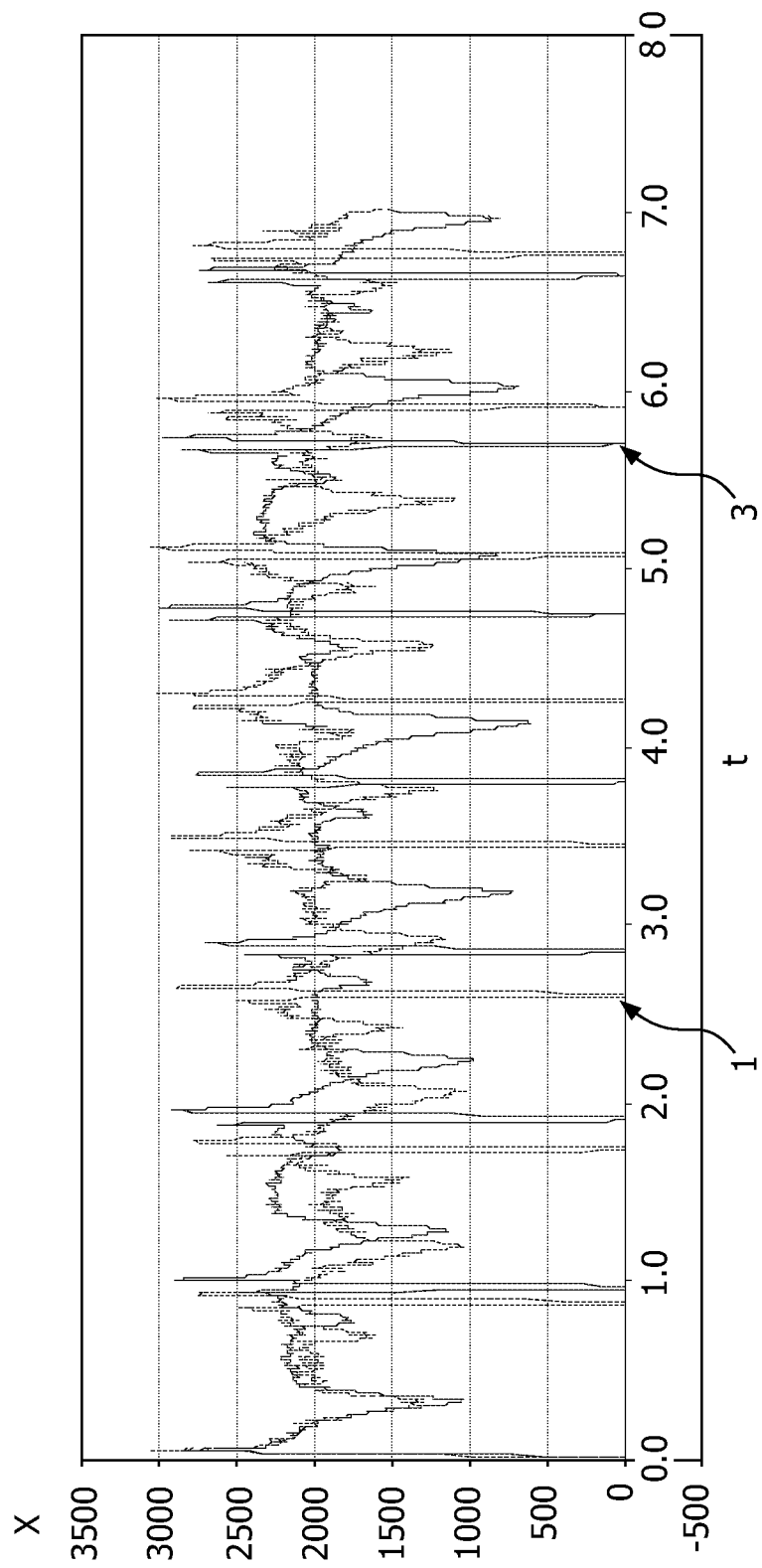
FIG. 2 shows an electrocardiogram (ECG) with two series with different heart rates FIG. 3 schematically shows a presentation of a snapshot of two synchronized frame sequences according to the invention FIG. 4 schematically shows an apparatus for correlating two image sequences of a periodically moving object according to a further embodiment of the present invention The illustration in the drawings is schematic only. It is noted that in different figures, similar or identical elements are provided with the same reference signs.

In FIG. 2 an electrocardiogram (ECG) of one patient with two different heart rates is presented. The first series of ECG signal 1 (lighter colour) was acquired before an intervention and the second series 3 (darker colour) was acquired after the intervention. The ordinate of the graph shows the electrical activity of the heart in arbitrary units, for example with in units obtained by multiplying volt values with a scaling factor. The abscissa shows the time in seconds (s).

This presentation shows the great differences in the heart rate which have to be taken into account when comparing frame sequences of the same patient acquired under difference circumstances or at different points in time.

In FIG. 3 a snapshot of two synchronized frame sequences according to the invention is presented. In the side by side presentation the left part shows a first frame sequence 13 corresponding to a pre-stenting image and the right side shows the second frame sequence 15 corresponding to a post-stenting image. In FIG. 3 a part of the heart and its arteries is shown. The images in the side by side presentation are synchronized with respect to the heart rate.

The side by side heart rate synchronized viewing of the image sequences results in a more accurate assessment possibility of the improved arterial and myocardial blood flow. This provides the possibility of visualizing and measuring a post-treatment increase of the arterial blood flow and myocardial perfusion with an improved accuracy.

In FIG. 4 an apparatus for correlating two image sequences of a periodically moving object according to a further embodiment of the present invention is presented. The apparatus comprises acquisition means 5 for acquiring the first frame sequence 13 and the second frame sequence 15. In this example, the acquisition means 5 is a C-arm system. Furthermore, the apparatus comprises computing means 7 for synchronizing the first and the second frame sequences. The computing means 7 synchronize the first and the second frame sequences based on the acquired input image sequences and the list of frame position numbers determined in step S 17 described with respect to FIG. 1. From the lists of the frame position numbers the computing means 7 may establish the difference in the number of frames between two matching frames representing the same phase of motion. The computing means 7 may be connected by cables or wirelessly to the acquisition means 5.

The computing means 7 may further be connected by cable or wirelessly to displaying means 11. The displaying means 11 may also be connected by cable or wirelessly to the acquisition means 5. The displaying means 11 may visualize the first frame sequence and also the second frame sequence for example during acquisition. Moreover, the displaying means 11 may display the first and the second frame sequences after acquisition and after synchronization in a spatially and temporarily correlated presentation. The correlated presentation may be a side by side view as shown in FIG. 3 or an overlay of the pre- and post-stenting image sequences.

It should be noted that the terms "comprising", "including" etc. do not exclude other elements or steps and the "a" or "an" does not exclude a plurality. Also elements described in association with different embodiments may be combined. It should also be noted that reference signs in the claims should not be construed as limiting the scope of the claims.

LIST OF REFERENCE SIGNS

1 ECG signal acquired before an intervention
3 ECG signal acquired after an intervention
5 acquisition means
7 computing means
11 displaying means
13 first frame sequence
15 second frame sequence
17 heart
t time in s
x electrical activity of the heart in µV
S 01 acquiring a first frame sequence
S 03 determining a starting frame in the first frame sequence
S 05 selecting image coordinates in the first frame sequence
S 07 subtracting a first frame from the first frame sequence
S 09 acquiring a second frame sequence
S 11 determining a starting frame in the second frame sequence
S 13 selecting image coordinates in the second frame sequence
S 15 subtracting the first frame from the second frame sequence
S 17 creating a list of frame position numbers for frames representing the same phase of motion from the first and from the second frame sequences
S 19 selecting the same number of heartbeats in the first and in the second frame sequences
S 21 synchronizing the first and the second frame sequences
S 23 displaying the first and the second frame sequences

The invention claimed is:

1. An imaging apparatus configured for correlating two image sequences of a periodically moving object with respect to the periodicity, said apparatus comprising:
   an imaging acquisition processor configured for acquiring:
      a first frame sequence of the object moving with a first periodicity, said first frame sequence comprising at least one cycle of motion; and
      a second frame sequence of the object moving with a second periodicity, said second frame sequence comprising at least one cycle of motion; and
   an imaging-frame-sequence synchronization processor for synchronizing the first and the second frame sequences with respect to the respective periodicity such that same phases of motion of the periodically moving object are correlated,
   said first frame sequence comprising two frames that match respective frames of said second frame sequence such that, between the two matching pairs of frames, a different number of frames exist for said first sequence than do for said second sequence, said synchronizing comprising equalizing the numbers by adding to the number of frames of the sequence with the smaller number of frames.

2. The apparatus according to claim 1, said equalizing comprising, to determine the difference, determining a first number of frames of said first frame sequence and a second number of frames of said second frame sequence.

3. The apparatus according to claim 1, said synchronizing being realized by adding a third number of frames to the frame sequence with the smaller number of frames between two matching frames, said third number of frames corresponding to the difference between the first number of frames and the second number of frames.

4. The apparatus according to claim 1, configured for subtracting a first frame of one of the first and the second frame sequences from all frames of both the first and the second frame sequence.

5. The apparatus according to claim 1, configured for determining a spatial correspondence between the first and the second frame sequences.

6. An imaging apparatus configured for correlating two image sequences of a periodically moving object with respect to the periodicity, said apparatus comprising:
   an imaging acquisition processor configured for acquiring:
      a first frame sequence of the object moving with a first periodicity, said first frame sequence comprising at least one cycle of motion; and
      a second frame sequence of the object moving with a second periodicity, said second frame sequence comprising at least one cycle of motion;
   an imaging-frame-sequence synchronization processor for synchronizing the first and the second frame sequences with respect to the respective periodicity such that same phases of motion of the periodically moving object are correlated; and
   a visual presentation device, said apparatus being further configured for, via said device, displaying the first and the second frame sequences after synchronization in a spatially and temporally corresponding presentation.

7. The apparatus according to claim 1, the periodically moving object being a heart, the respectively matching frames corresponding to the same phase of a heart cycle.

8. Apparatus for correlating two image sequences of a periodically moving object with respect to the periodicity, the apparatus comprising:
   acquisition means for acquiring a first frame sequence of the object moving with a first periodicity and for acquiring a second frame sequence of the object moving with a second periodicity; wherein the first frame sequence comprises at least one cycle of motion; wherein the second frame sequence comprises at least one cycle of motion; and
   computing means for synchronizing the first and the second frame sequence with respect to the respective periodicity such that same phases of motion of the periodically moving object are correlated, wherein the computing means is configured for selecting at least two respectively matching frames with respect to a same phase of motion from the first frame sequence and from the second frame sequence; wherein the computing means is configured for determining a first number of frames between two matching frames in the first frame sequence and determining a second number of frames between two matching frames in the second frame sequence; wherein the computing means is configured for comparing the first number of frames and the second number of frames; and wherein the synchronizing is based on the comparing result, said apparatus further comprising displaying means for displaying the first and the second frame sequence after synchronization in a spatially and temporally correlated presentation.

9. A non-transitory computer readable medium for correlating two image sequences of a periodically moving object with respect to the periodicity, said medium embodying a program having instructions executable by a processor for performing a plurality of acts, among said acts there being the acts of:

acquiring a first frame sequence of the object moving with a first periodicity, said first frame sequence comprising at least one cycle of motion; and acquiring a second frame sequence of the object moving with a second periodicity, said second frame sequence comprising at least one cycle of motion;

synchronizing the first and the second frame sequences with respect to the respective periodicity such that same phases of motion of the periodically moving object are correlated; and displaying the first and the second frame sequences after synchronization in a spatially and temporally corresponding presentation, said acts being performed by an imaging apparatus.

10. The computer readable medium of claim 9, among the plural acts there being a further act of subtracting a first frame of one of the first and the second frame sequences from all frames of both the first and the second frame sequence.

11. The computer readable medium of claim 9, said first frame sequence comprising two frames that match respective frames of said second frame sequence such that, between the two matching pairs of frames, a different number of frames exist for said first sequence than do for said second sequence, said synchronizing comprising equalizing the numbers by adding to the number of frames of the sequence with the smaller number of frames.

12. The computer readable medium of claim 9, said displaying comprising side by side heart-rate synchronized viewing of the frame sequences.

13. The apparatus according to claim 6, configured for subtracting a first frame of one of the first and the second frame sequences from all frames of both the first and the second frame sequence.

14. The apparatus according to claim 6, said first frame sequence comprising two frames that match respective frames of said second frame sequence such that, between the two matching pairs of frames, a different number of frames exist for said first sequence than do for said second sequence, said synchronizing comprising equalizing the numbers by adding to the number of frames of the sequence with the smaller number of frames.

15. The apparatus according to claim 6, said displaying comprising side by side heart-rate synchronized viewing of the frame sequences.

16. The apparatus according to claim 8, configured for subtracting a first frame of one of the first and the second frame sequences from all frames of both the first and the second frame sequence.

17. The apparatus of claim 8, further comprising a visual presentation device, said apparatus being further configured for, via said device, displaying the first and the second frame sequences after synchronization in a spatially and temporally corresponding presentation.

18. The apparatus of claim 17, said displaying comprising side by side heart-rate synchronized viewing of the frame sequences.

* * * * *